United States Patent
Pan et al.

(10) Patent No.: US 10,269,123 B2
(45) Date of Patent: Apr. 23, 2019

(54) METHODS AND APPARATUS FOR VIDEO BACKGROUND SUBTRACTION

(71) Applicant: QUALCOMM Incorporated, San Diego, CA (US)

(72) Inventors: Yunke Pan, San Diego, CA (US); Ying Chen, San Diego, CA (US); Jian Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 15/402,103

(22) Filed: Jan. 9, 2017

(65) Prior Publication Data
US 2018/0197294 A1    Jul. 12, 2018

(51) Int. Cl.
| G06T 7/194 | (2017.01) |
| G06K 9/00 | (2006.01) |
| G06K 9/62 | (2006.01) |
| G06T 7/174 | (2017.01) |
| G06K 9/32 | (2006.01) |
| G06T 7/11 | (2017.01) |

(52) U.S. Cl.
CPC .......... G06T 7/194 (2017.01); G06K 9/00718 (2013.01); G06K 9/3241 (2013.01); G06K 9/6212 (2013.01); G06K 9/6272 (2013.01); G06T 7/11 (2017.01); G06T 7/174 (2017.01); G06K 9/00771 (2013.01); G06T 2207/10016 (2013.01); G06T 2207/10024 (2013.01); G06T 2207/30232 (2013.01)

(58) Field of Classification Search
None
See application file for complete search history.

(56) References Cited

U.S. PATENT DOCUMENTS

| 7,724,947 | B2 | 5/2010 | Forutanpour |
| 8,265,392 | B2 | 9/2012 | Wang et al. |
| 8,792,013 | B2 | 7/2014 | Levy |
| 9,152,243 | B2 | 10/2015 | Gu |
| 2008/0130744 | A1 | 6/2008 | Huang et al. |
| 2009/0066790 | A1* | 3/2009 | Hammadou ..... G08B 13/19636 348/143 |
| 2010/0208986 | A1 | 8/2010 | Cobb et al. |
| 2010/0208998 | A1* | 8/2010 | Van Droogenbroeck .................... G06K 9/38 382/195 |
| 2013/0084006 | A1* | 4/2013 | Zhang ................... G06T 7/0081 382/173 |
| 2013/0176430 | A1 | 7/2013 | Zhu et al. |

(Continued)

OTHER PUBLICATIONS

Santoyo-Morales J.E., et al., "Video Background Subtraction in Complex Environments", Journal of Applied Research and Technology, vol. 12, No. 3, Jun. 2014, pp. 527-537.

*Primary Examiner* — Kevin Ky
(74) *Attorney, Agent, or Firm* — Polsinelli LLP

(57) ABSTRACT

Methods and an apparatus for background subtraction are described. According to some implementations, the temporal history of a pixel location can be used to classify whether a current input pixel of a current input video frame is a background pixel or a foreground pixel. The classification can be made based on the number of matching pixels in corresponding pixel locations in background history planes. One of the background history planes can be updated according to the classified background pixels and persistent classified foreground pixels.

27 Claims, 14 Drawing Sheets

(56) References Cited

U.S. PATENT DOCUMENTS

| | | | |
|---|---|---|---|
| 2014/0071241 A1 | 3/2014 | Yang et al. | |
| 2014/0198257 A1* | 7/2014 | Gagvani | G06K 9/00543 |
| | | | 348/700 |
| 2015/0003675 A1 | 1/2015 | Nakagami | |
| 2016/0005182 A1* | 1/2016 | Ashani | G06K 9/46 |
| | | | 382/173 |
| 2017/0358098 A1* | 12/2017 | Lloyd | G06T 7/50 |
| 2018/0089523 A1* | 3/2018 | Itakura | G06T 7/194 |

* cited by examiner

| Pixel 1201A | Pixel 1202A | Pixel 1203A | Pixel 1204A |
|---|---|---|---|
| Pixel 1205A | Pixel 1206A | Pixel 1207A | Pixel 1208A |
| Pixel 1209A | Pixel 1210A | Pixel 1211A | Pixel 1212A |
| Pixel 1213A | Pixel 1214A | Pixel 1215A | Pixel 1216A |

INPUT VIDEO FRAME 1200A

FIG. 12A

| Pixel 1201B | Pixel 1202B | Pixel 1203B | Pixel 1204B |
|---|---|---|---|
| Pixel 1205B | Pixel 1206B | Pixel 1207B | Pixel 1208B |
| Pixel 1209B | Pixel 1210B | Pixel 1211B | Pixel 1212B |
| Pixel 1213B | Pixel 1214B | Pixel 1215B | Pixel 1216B |

HISTORY PLANE 1200B

METHODS AND APPARATUS FOR VIDEO BACKGROUND SUBTRACTION

FIELD

The present disclosure generally relates to video analytics, and more specifically to techniques and systems for background subtraction of a video frame.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provide a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for background subtraction in video analytics. Background subtraction refers to the process of analyzing video frames from a fixed camera, over an indefinite time period, to determine pixels associated with the background, or fixed areas of the scene. Background subtraction can be used to separate background pixels from foreground pixels. Neighboring foreground pixels can be grouped into blobs. A blob represents at least a portion of one or more objects in a video frame (also referred to as a "picture"). Blobs can be associated with blob trackers, which can track the movement of an object represented by a blob as the object moves within the scene.

In various implementations, methods and an apparatus for background subtraction are described. According to some implementations, the temporal history of a pixel location can be used to classify whether a current input pixel of a current input video frame is a background pixel or a foreground pixel. The classification can be made based on the number of matching pixels in corresponding pixel locations in background history planes. One or more of the background history planes can be updated according to the classified background pixels. The history plane to be updated can be determined at the frame level, which means that the pixels from the current input video frame update only the pixels within the one or more history plane selected for updating. Only the pixel at the corresponding pixel location of the background history plane can be replaced with the classified background pixel. The process of updating a history plane with classified background pixels can be operated periodically (e.g., once every K input frames). The background history plane can also be updated according to certain classified foreground pixels. For example, the background history plane can be updated if a persistent counter of a classified foreground pixel indicates that it is foreground in a sufficient number of continuous or successive frames. Similar to background pixels, only the pixel at the corresponding pixel location of the background history plane can be replaced with the classified foreground pixel.

According to at least one example, a method of performing background subtraction for a plurality of frames is provided that includes obtaining an input frame and selecting a pixel location from the input frame. The method further includes comparing a pixel value for a pixel at the selected pixel location to one or more pixel values in corresponding pixel locations of a plurality of history planes. Each of the plurality of history planes includes a historical background pixel value in a corresponding pixel location that corresponds to the selected pixel location. The method further includes classifying the pixel at the selected pixel location as a background pixel when a difference between the pixel value and the one or more pixel values of the plurality of history planes is less than a threshold value. The method further includes resetting a foreground counter associated with the pixel location when the pixel at the selected pixel location is classified as a background pixel. The foreground counter includes a number of instances of one or more pixels at the selected pixel location being consecutively classified as a foreground pixel.

In another example, an apparatus for performing background subtraction is provided that includes a memory configured to store video data and a processor. The processor is configured to and can obtain an input frame and select a pixel location from the input frame. The processor is configured to and can compare a pixel value for a pixel at the selected pixel location to one or more pixel values in corresponding pixel locations of a plurality of history planes. Each of the plurality of history planes includes a historical background pixel value in a corresponding pixel location that corresponds to the selected pixel location. The processor is configured to and can classify the pixel at the selected pixel location as a background pixel when a difference between the pixel value and the one or more pixel values of the plurality of history planes is less than a threshold value. The processor is configured to and can reset a foreground counter associated with the pixel location when the pixel at the selected pixel location is classified as a background pixel. The foreground counter includes a number of instances of one or more pixels at the selected pixel location being consecutively classified as a foreground pixel.

In another example, a computer readable medium is provided having stored thereon instructions that when executed by a processor perform steps including obtaining an input frame and selecting a pixel location from the input frame. The steps further include comparing a pixel value for a pixel at the selected pixel location to one or more pixel values in corresponding pixel locations of a plurality of history planes. Each of the plurality of history planes includes a historical background pixel value in a corresponding pixel location that corresponds to the selected pixel location. The steps further include classifying the pixel at the selected pixel location as a background pixel when a difference between the pixel value and the one or more pixel values of the plurality of history planes is less than a threshold value. The steps further include resetting a foreground counter associated with the pixel location when the pixel at the selected pixel location is classified as a background pixel. The foreground counter includes a number of instances of one or more pixels at the selected pixel location being consecutively classified as a foreground pixel.

In some aspects, the method, apparatus, and computer readable medium further include: selecting a history plane from the plurality of history planes; and replacing a pixel value of a corresponding pixel location in the selected history plane with the pixel value at the selected pixel location of the input frame.

In some aspects, the history plane is selected randomly from the plurality of history planes.

In some aspects, the method, apparatus, and computer readable medium further include incrementing a background pixel counter for the input frame when a pixel of the input frame is classified as a background pixel.

In some aspects, selecting the history plane from the plurality of history planes includes: determining a value of the background pixel counter for the input frame; deriving a plane number from one or more bits of the value of the background pixel counter; and selecting the history plane corresponding to the plane number.

In some aspects, selecting the history plane from the plurality of history planes includes: determining a value of the background pixel counter for a previous frame of the plurality of frames; deriving a plane number from one or more bits of the value of the background pixel counter; and selecting the history plane corresponding to the plane number.

In some aspects, the method, apparatus, and computer readable medium further include: selecting an additional pixel location from the input frame; obtaining a pixel value for a pixel at the selected additional pixel location; comparing the pixel value at the selected additional pixel location to one or more pixel values in corresponding additional pixel locations of the plurality of history planes; classifying the pixel at the additional pixel location as a foreground pixel when a difference between the pixel value at the selected additional pixel location and the one or more pixel values in the corresponding additional pixel locations is greater than the threshold value; and incrementing a foreground counter associated with the additional pixel location when the pixel at the selected additional pixel location is classified as a foreground pixel, the foreground counter including a number of instances of the additional pixel location being classified as a foreground pixel.

In some aspects, the method, apparatus, and computer readable medium further include: determining a value of the foreground counter associated with the additional pixel location is greater than a threshold persistence value; determining the selected history plane from the plurality of history planes; and replacing a pixel value at the additional pixel location of the selected history plane with the pixel value at the selected additional pixel location of the input frame when the value of the foreground counter is greater than the threshold persistence value.

In some aspects, the pixel value includes a luminance value for the pixel.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 12A is a schematic diagram illustrating an example of input video frame, in accordance with some examples.

FIG. 12B is a schematic diagram illustrating an example of a history plane, in accordance with some examples.

DETAILED DESCRIPTION

Figure 1:
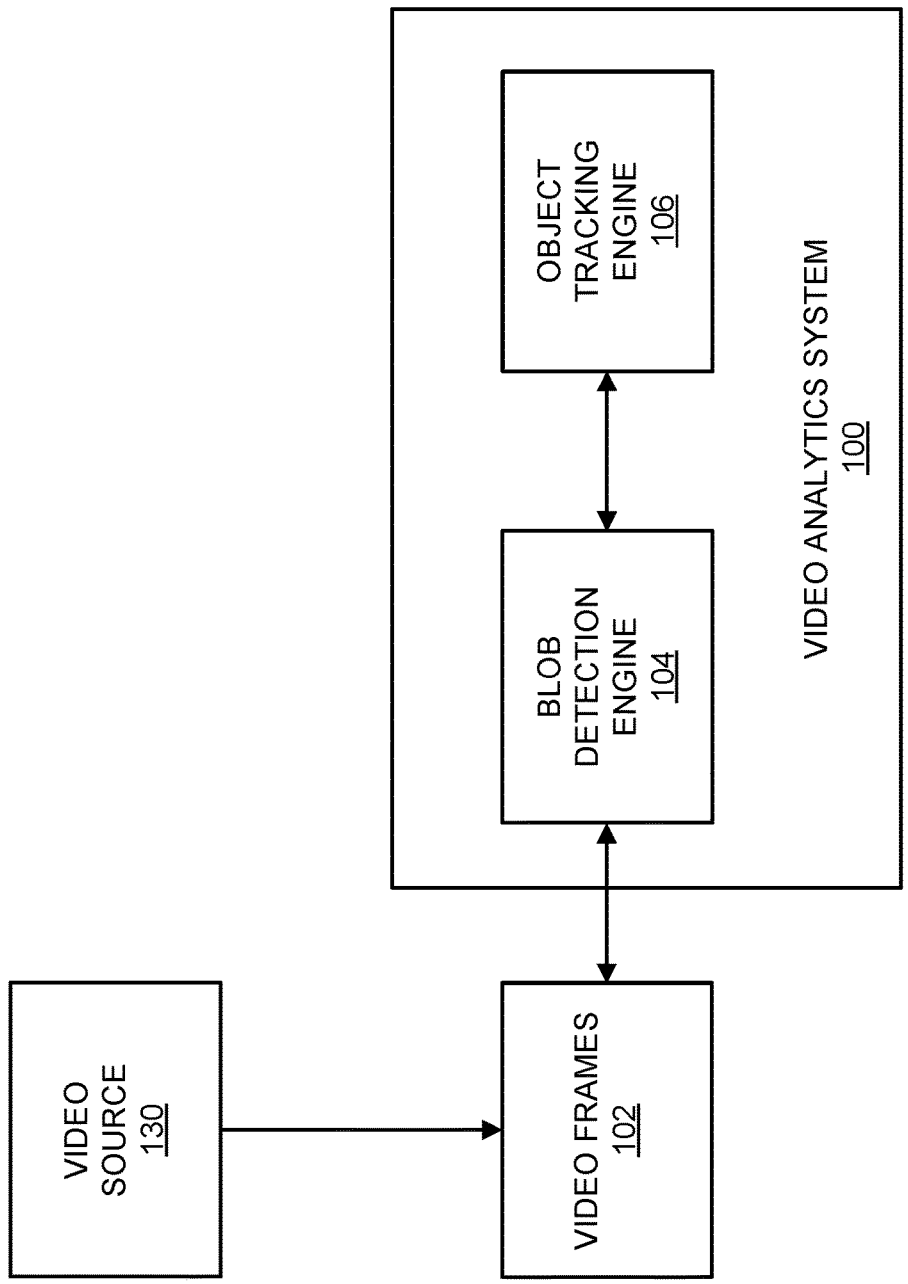
FIG. 1 is a block diagram illustrating an example of a system including a video source and a video analytics system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a video sequence from a video source and can process the video sequence to provide a variety of tasks. One example of a video source can include an Internet protocol camera (IP camera), or other video capture device. An IP camera is a type of digital video camera that can be used for surveillance, home security, or other suitable applications. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of event of interest and sends an alert or alarm to a central control room to alert a user of the event of interest.

To perform the tasks described above, as well as other tasks, a video analytics system can perform operations for detecting objects moving in a scene being viewed by a stationary camera. These operations can include background subtraction, or the separation of background pixels from foreground pixels in a particular video frame. The foreground pixels may subsequently be grouped into blobs. The video analytics system can generate blob trackers for the blobs, which can maintain historical information about blobs as the objects associated with the blobs move around in the scene.

For some background subtraction methods, a video analytics system typically generates a model for the background of a scene. The model can provide, for each pixel location in a video frame, one or more values for a pixel identified as a background pixel. The video analytics system can use the model to generate background and/or foreground masks, and use the background and/or foreground masks to determine foreground pixels and background pixels in a particular video frame.

As described in more detail below, systems and methods are described herein for performing background subtraction that overcomes many of disadvantages of existing background subtraction techniques. For example, the background subtraction techniques described herein can maintain a pixel background history and a pixel foreground persistence, which may be used to classify whether an input pixel is a background or foreground pixel and to determine whether to update the background history with the input pixel value.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection engine 104 can detect one or more blobs in video frames (e.g., video frames 102) of a video sequence, and the object tracking engine 106 can track the one or more blobs across the frames of the video sequence. As used herein, a blob refers to pixels of at least a portion of an object in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, and a history of the velocity, and a history of location, of continuous frames, for the blob tracker, as described in more detail below.

As described in further detail below, a motion model for a blob tracker can determine and maintain two locations of the blob tracker for each frame (e.g., a first location that includes a predicted location in the current frame and a second location that includes a location in the current frame of a blob with which the tracker is associated in the current frame). As also described in more detail below, the velocity of a blob tracker can include the displacement of a blob tracker between consecutive frames.

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIG. 3-FIG. 4.

Figure 2:
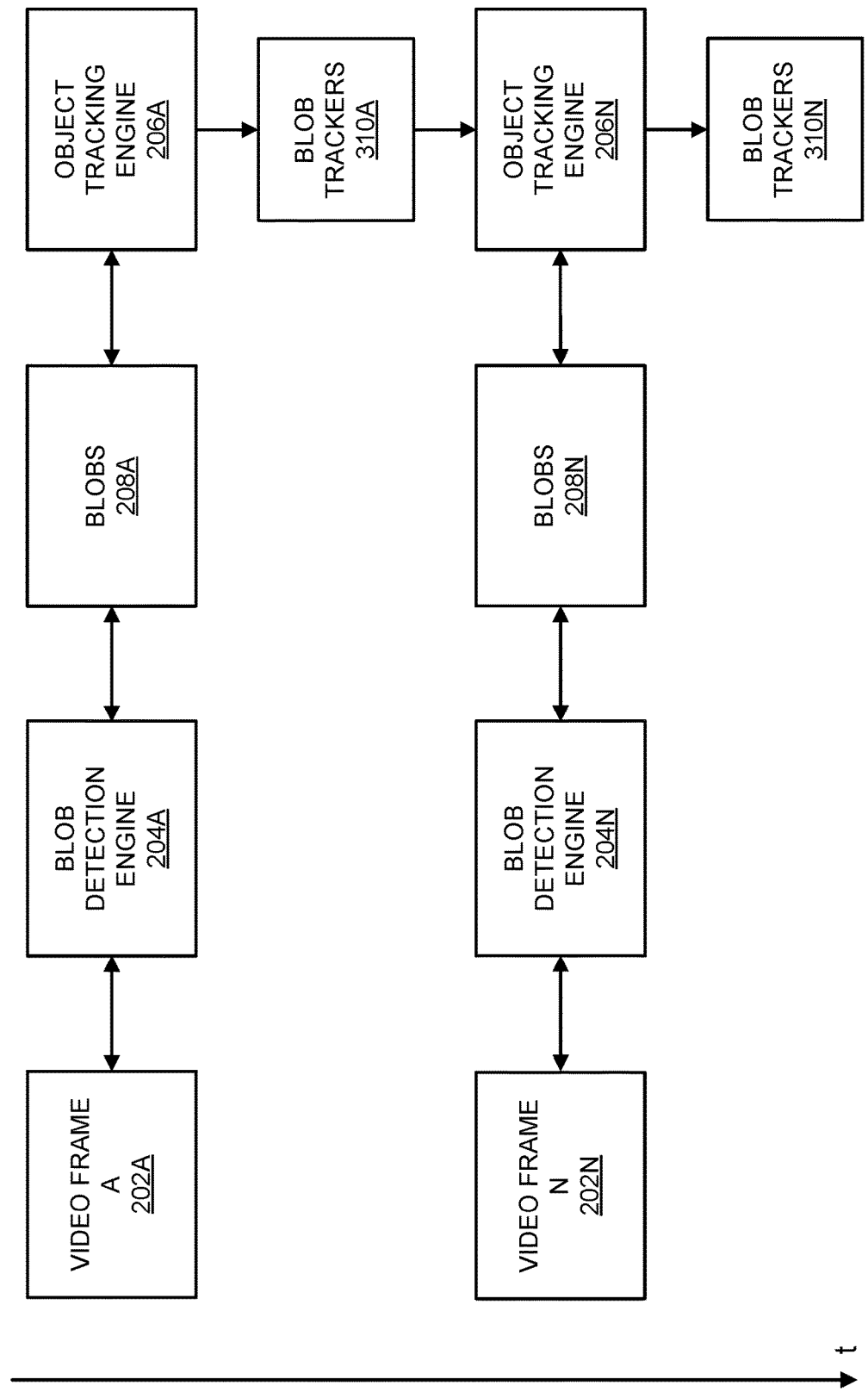
FIG. 2 is a block diagram illustrating an example of a video analytics system processing video frames, in accordance with some examples.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. Costs (e.g., a cost including a distance, a weighted distance, or other cost) between blob trackers and blobs can be calculated by the object tracking engine 206A. The object tracking engine 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
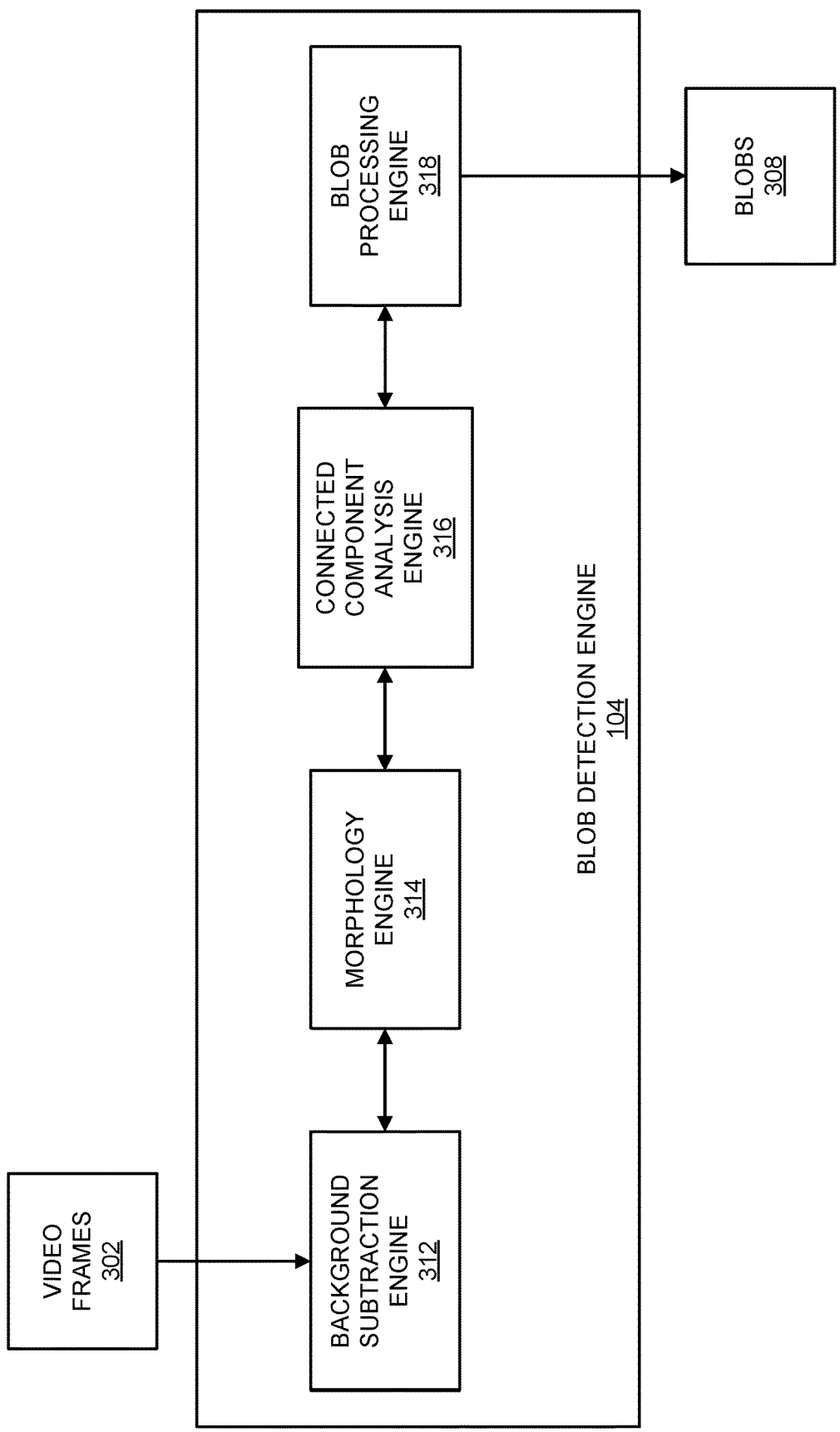
FIG. 3 is a block diagram illustrating an example of a blob detection engine, in accordance with some examples.

FIG. 3 is a block diagram illustrating an example of a blob detection engine 104. Blob detection is used to segment moving objects from the global background in a scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and history planes including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purposes. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction), including any of the techniques described herein. One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (GMM). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N\left(X_t \mid \mu_{i,t}, \sum_{i,t}\right)$$

Equation (1)

An equation of the GMM model is shown in equation (1), wherein there are K Gaussian models. Each Gaussian model has a distribution with a mean of μ and variance of Σ, and has a weight ω. Here, i is the index to the Gaussian model and t is the time instance. As shown by the equation, the parameters of the GMM change over time after one frame (at time t) is processed.

The background subtraction techniques mentioned above are based on the assumption that the camera is mounted still, and if anytime the camera is moved or orientation of the camera is changed, a background model will need to be calculated (e.g., a background history plane will need to be updated). There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3x3) to a 3x3 filter window of a center pixel, which is currently being processed. The 3x3 window can be applied to each foreground pixel (as the center pixel) in the foreground mask. One of ordinary skill in the art will appreciate that other window sizes can be used other than a 3x3 window. The erosion function can include an erosion operation that sets a current foreground pixel in the foreground mask (acting as the center pixel) to a background pixel if one or more of its neighboring pixels within the 3x3 window are background pixels. Such an erosion operation can be referred to as a strong erosion operation or a single-neighbor erosion operation. Here, the neighboring pixels of the current center pixel include the eight pixels in the 3x3 window, with the ninth pixel being the current center pixel.

A dilation operation can be used to enhance the boundary of a foreground object. For example, the morphology engine 314 can apply a dilation function (e.g., FilterDilate3x3) to a 3x3 filter window of a center pixel. The 3x3 dilation window can be applied to each background pixel (as the center pixel) in the foreground mask. One of ordinary skill in the art will appreciate that other window sizes can be used other than a 3x3 window. The dilation function can include a dilation operation that sets a current background pixel in the foreground mask (acting as the center pixel) as a foreground pixel if one or more of its neighboring pixels in the 3x3 window are foreground pixels. The neighboring pixels of the current center pixel include the eight pixels in the 3x3 window, with the ninth pixel being the current center pixel. In some examples, multiple dilation functions can be applied after an erosion function is applied. In one illustrative example, three function calls of dilation of 3x3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with a 3x3 window size is called first, and three function calls of dilation of the 3x3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. One example of the connected component analysis performed by the connected component analysis engine 316 is implemented as follows:

for each pixel of the foreground mask {
  if it is a foreground pixel and has not been processed, the following steps apply:
    Apply FloodFill function to connect this pixel to other foreground and generate a connected component
    Insert the connected component in a list of connected component.
    Mark the pixels in the connected component as being processed.}

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, the blob processing engine 318 can perform content-based filtering of certain blobs. For instance, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some examples, the blob processing engine 318 can merge close blobs into one big blob to remove the risk of having too many small blobs that could belong to one object. In some examples, the blob processing engine 318 can filter out one or more small blobs that are below a certain size threshold (e.g., an area of a bounding box surrounding a blob is below an area threshold). In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

Figure 4:
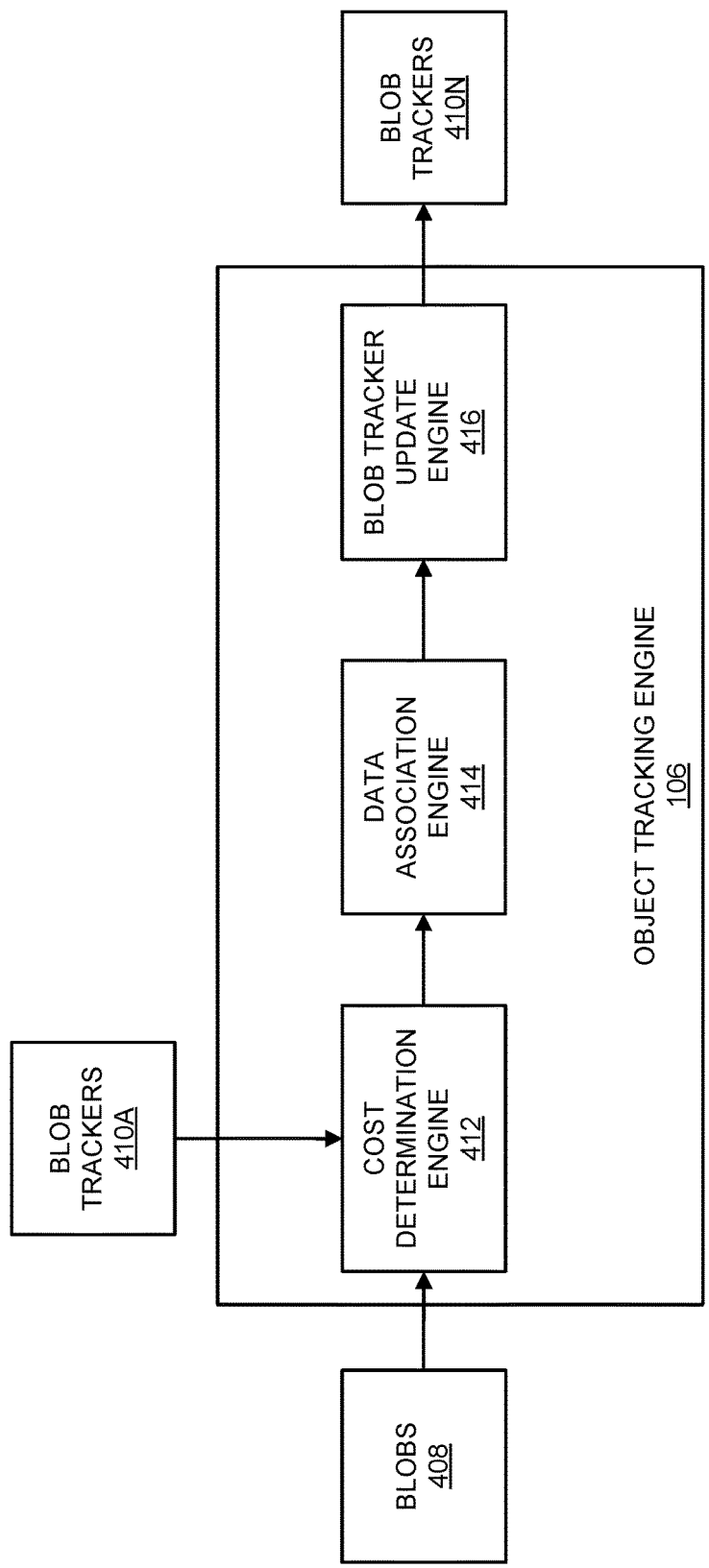
FIG. 4 is a block diagram illustrating an example of an object tracking engine, in accordance with some examples.

FIG. 4 is a block diagram illustrating an example of an object tracking engine 106. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A). A cost function can then be used to calculate costs between the object trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x - b_x)^2 + (t_y - b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker with a corresponding blob and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible.

Regardless of the association technique that is used, the data association engine 414 can rely on the distance between the blobs and trackers. The location of the foreground blobs are identified with the blob detection engine 104. However, a blob tracker location in a current frame may need to be predicated from a previous frame (e.g., using a location of a blob associated with the blob tracker in the previous frame). The calculated distance between the identified blobs and estimated trackers is used for data association. After the data association for the current frame, the tracker location in the current frame can be identified with its associated blob's (or blobs') location in the current frame. The tracker's location can be further used to update the tracker's motion model and predict its location in the next frame.

Once the association between the blob trackers 410A and blobs 408 has been completed, the blob tracker update engine 416 can use the information of the associated blobs, as well as the trackers' temporal statuses, to update the states of the trackers 410A for the current frame. Upon updating the trackers 410A, the blob tracker update engine 416 can perform object tracking using the updated trackers 410N, and can also provide the update trackers 410N for use for a next frame.

The state of a blob tracker can include the tracker's identified location (or actual location) in a current frame and its predicted location in the next frame. The state can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., 2 or more), or other suitable tracker states.

Other than the location of a tracker, there may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified at its predicted location from the previous frame, meaning that the motion model for the blob tracker is not corrected and the prediction propagates with the blob tracker's last model (from the previous frame).

Regardless of the tracking method being used, a new tracker starts to be associated with a blob in one frame and, moving forward, the new tracker may be connected with possibly moving blobs across multiple frames. When a tracker has been continuously associated with blobs and a duration has passed, the tracker may be promoted to be a normal tracker and output as an identified tracker-blob pair. A tracker-blob pair is output at the system level as an event (e.g., presented as a tracked object on a display, output as an alert, or other suitable event) when the tracker is promoted to be a normal tracker. A tracker that is not promoted as a normal tracker can be removed (or killed), after which the track can be considered as dead.

As described above, background subtraction can be based on a Gaussian Mixture Model (GMM). In statistics, a mixture model is a probabilistic model for representing the presence of subpopulations within an overall population, without requiring that an observed data set should identify the sub-population to which an individual observation belongs. Gaussian Mixture Models are often used for data clustering. As applied to video analytics, a Gaussian Mixture Model can determine a probability that a pixel at a particular location is associated with the background or the foreground, based on the pixel's values and the pixel values at the same location in prior frames.

While generally good at determining a background model, the Gaussian Mixture Model can have some limitations. For example, the data usage of the Gaussian Mixture Model can be very large, possibly requiring dozens of bytes per pixel (depending on the parameters of the model). For each input video frame, all of the data for each pixel typically needs to be read, modified after processing, and written back to a storage medium. Thus methods that use the Gaussian Mixture Model can potentially require a large amount of data storage, data transmission bandwidth, and/or processing capability.

As another example, the rate at which a video analytics system determines, or "learns" the background of a scene can be tuned, so that the system can learn the background quickly or more slowly. Slow learning, for example, may lead to more accurate background modeling, because moving objects that are temporarily stationary are less likely to be absorbed into the background. A slower learning, rate, however, may require higher precision calculations to control for round-off effects. These higher precision calculations may also increase storage and bandwidth requirements when using the Gaussian Mixture Model.

Methods that use the Gaussian Mixture Model also typically do not take advantage of the spatial correlation between neighboring pixels. In many cases, nearby pixels may have similar or related color values, direction of motion, and/or tendency to change. For example, a group of pixels may represent a stationary object in the background, and as the lighting changes during the day, the group of pixels may change in color in a similar fashion. The Gaussian Mixture Model analyzes the statistical behavior, over time, of each pixel location independently of other pixel locations, and thus in most cases does not make use of the spatial correlation between neighboring pixels.

The Gaussian Mixture Model can build a detailed and robust model of the recent behavior of a region pixels, modelling, for example, the statistics of a current foreground object in the region while maintaining a previous background state for the region. In a model using the Gaussian Mixture Model, however, it can be difficult to which elements of the model apply to the background and which apply to the foreground, and to correlate the foreground and background modeling information among a set of neighboring pixels. As noted above, the Gaussian Mixture Model maintains an independent model for each pixel location, and generally does not make use of the spatial relationships between neighboring pixels. A model that uses the Gaussian Mixture Model can be used to identify background or foreground pixels for a input video frame, though spatial filtering is frequently applied to make the identification more reliable and coherent. A background modeling technique that makes use of the spatial correlation between neighboring pixels may make the identification of background and foreground pixels simpler and/or more robust.

Other methods for determining a background model use a Visual Background Extractor (ViBe) model. According to ViBe, a background history is maintained for each pixel location. An incoming pixel is compared with the background history for that pixel location to determine whether it belongs to the foreground or the background of the input frame. If the pixel is classified as background, the background history is updated for both spatial locations (e.g., neighboring locations) and the temporal location. The update rate and update location are random, making ViBe robust to detect both short-term and long-term background.

Specifically, according to ViBe, a pixel's background history is initialized with its value and its neighbors' values. An incoming pixel is matched with its background history. The incoming pixel is classified as background if it is matched to pixels in the background history. Once classified, it is randomly determined whether the pixel is used to update its background history. If it is used, the location of the replaced pixel in the background history is also determined randomly. It is also randomly determined whether the pixel is used to update the background history of the pixel's neighboring pixels. If it is used, the location of the replaced pixel in the neighbors' background history is also determined randomly. If no matching pixel is found in the background history, the pixel is classified as foreground.

Unlike GMM, the foreground extracted by ViBe is more stable because of the random processing. However, the randomness also introduces significant complexity in an embedded system. First, random memory access has a significant penalty in SDRAM memory. In this case, the opening page and closing page operations in SDRAM dominate the memory accessing time, and only a fractional time is used for actual data transfer. Second, the random function itself has high cost. For each pixel classified as background, there are given associated random functions. As a result, there are millions of random functions called for each frame. Third, once a moving object stops in the scene, it takes a long time on the foreground mask for the object to decay as background. This is because ViBe updates background history using only background pixels. It relies on updating neighbors' history to gradually claim a still object which moved previously as background. Fourth, ViBe is not suitable for vector processors because of the randomness. Fifth, ViBe is not suitable for multi-thread analysis because all of the pixels are related by updating neighbors' histories.

Thus, in various implementations, systems and methods are described herein for performing background subtraction for a plurality of frames that overcomes many of the above-noted disadvantages of GMM and ViBe. The background subtraction techniques described herein can maintain a pixel background history and a pixel foreground persistence. These may be used to classify whether an input pixel is a background or foreground pixel and to determine whether to update the background history with the input pixel value.

The implementations described herein have a number of advantages. First, because the processing is based only on pixel values, only addition, subtraction and comparison operations are required. Second, the pixel update is plane-based, making it friendly for vector processors. Third, the plane-based update mechanism can also improve memory access efficiency because of contiguous memory access. In comparison to ViBe, only co-located pixels in the background history are updated, which makes pixels in the frame independent, which is convenient for a multi-thread processor. Further in comparison to ViBe, consideration of the pixel foreground persistence significantly increases object decaying speed in the foreground mask once the object stops moving. In comparison to GMM, using a plurality of history planes significantly reduces noise in the foreground mask.

With respect to processing time, the implementations described herein are more efficient than GMM and ViBe. In one illustrative example, for 1080p video, the average processing time per frame over 300 frames is 171 ms/frame for GMM, 111 ms/frame for ViBe, and 40 ms/frame when the background subtraction techniques described herein are used.

Figure 5:
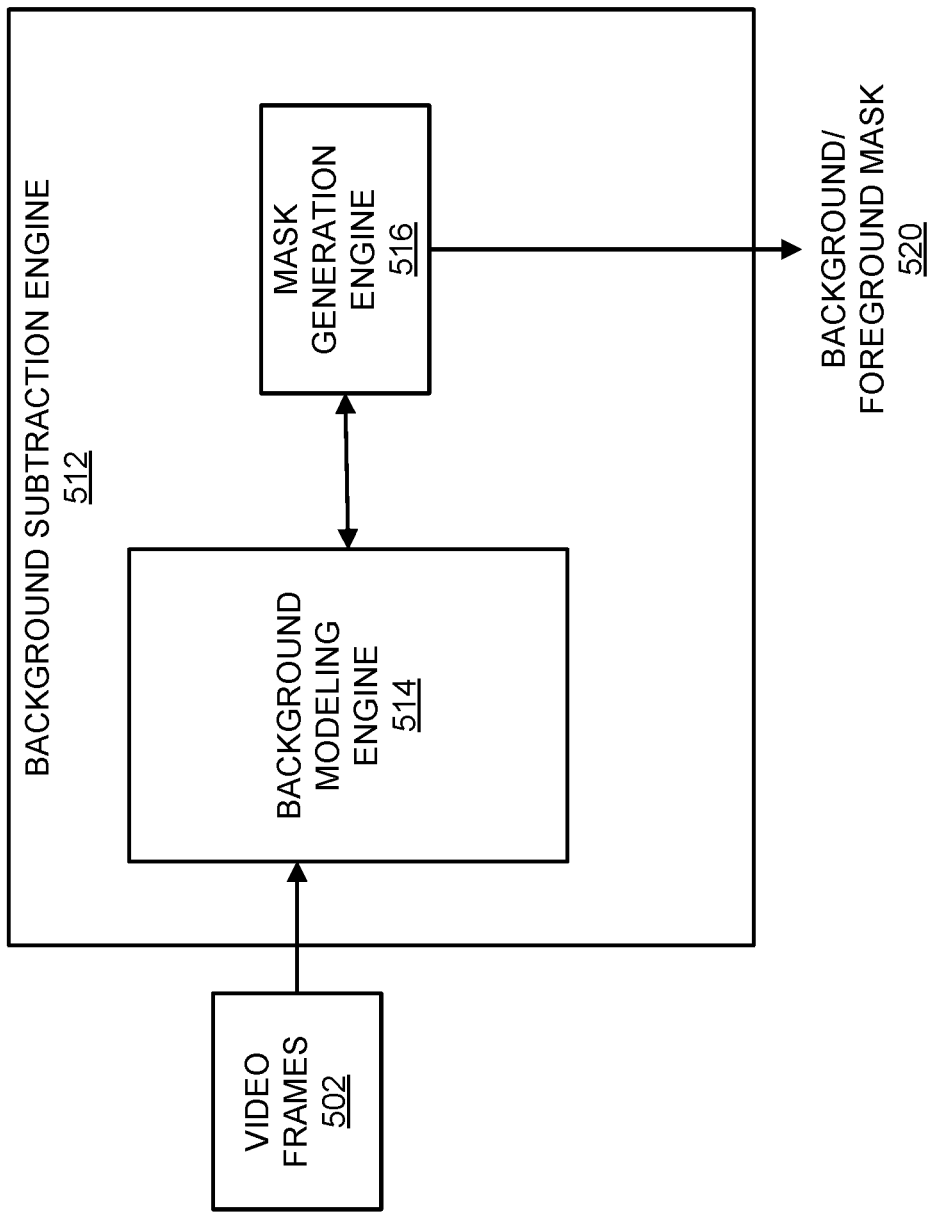
FIG. 5 is a block diagram illustrating an example of a background subtraction engine, in accordance with some examples.

FIG. 5 illustrates an example of a background subtraction engine 512 that can implement the techniques described herein. In various implementations, the background subtraction engine 512 includes a background modeling engine 514 and a mask generation engine 516. The background subtraction engine 512 can receive a sequence of video frames 502, which are being processed to identify and track blobs. The background subtraction engine 512 can output a background/foreground mask 520 determined for a particular input video frame 502.

When the background subtraction engine 512 receives an input video frame 502, the background modeling engine 514 can, for each pixel location in the input video frame 502, make a statistical determination as to whether the pixel location in the input video frame 502 should be classified a background pixel or a foreground pixel. As additional video frames 502 are received, the background modeling engine 514 can adjust and modify the statistical determination for each pixel location using background history planes. Over time, background history planes can be updated to "learn" the pixel values that represent the background, for each pixel location in captured scene. Additionally, the background history planes can adjust as the background changes due to, for example, changes in lighting, moving shadows, and objects becoming features of the background or being removed as features from the background.

The mask generation engine 516 can use pixel classifications to generate a background/foreground mask 520, which can also be referred to as a foreground mask. The background/foreground mask 520 can indicate, for each pixel location in a particular input video frame, whether the pixel location corresponds to the background or the foreground of the particular video frame. In some cases, there may be no foreground pixels, such as for example when no objects are moving in the scene. In some cases, the background pixels may include objects that were formerly foreground objects, but that have stopped moving and thus have appear to be part of the background. The background/foreground mask 520 can be used, for example, to determine the blobs in the particular video frame.

Figure 6:
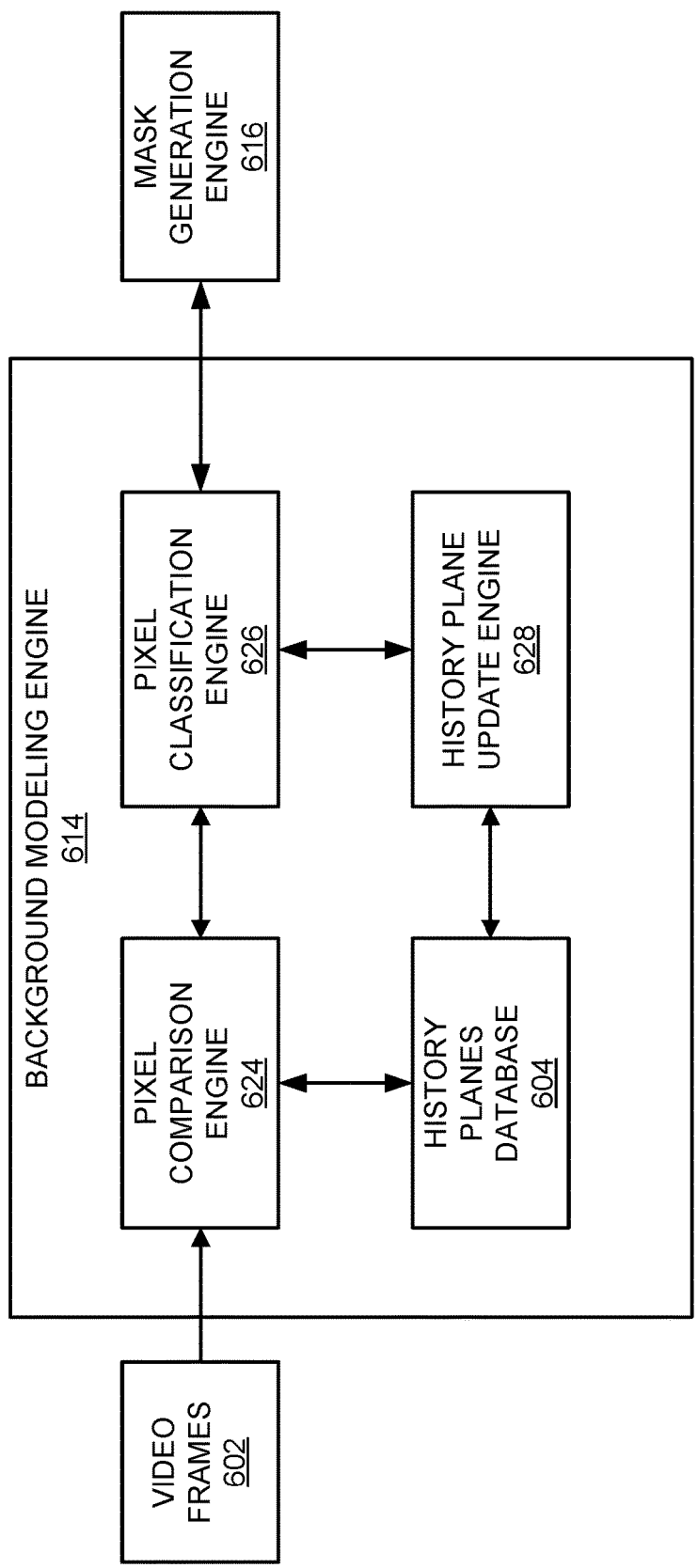
FIG. 6 is a block diagram illustrating an example of a background modeling engine, in accordance with some examples.

In some implementations, the background modeling engine 514 can use background history planes and pixel foreground persistences to determine pixel classifications. FIG. 6 illustrates an example of a background modeling engine 614 that includes multiple engines for determining whether a pixel should be classified as a foreground pixel or a background pixel. In various implementations, the background modeling engine 614 can include a pixel comparison engine 624, a pixel classification engine 626, a history plane update engine 628, and a history planes database 604.

As discussed above, the background modeling engine 614 can receive the video frames 602 received by a background subtraction engine. In some implementations, the video frames 602 undergo a data reduction process before the video frames 602 are received by the background subtraction engine. The data reduction process can reduce the size of an input video frame 602 (e.g., the number of bits or bytes used to represent the input video frame 602), possibly reducing the amount of data that is computed over by an engine such as the background modeling engine 614.

In the example of FIG. 6, the background modeling engine 614 provides the input video frames 602 to a pixel comparison engine 624. The pixel comparison engine 624 can select a pixel location from an input video frame 602 according to any method. For example, the pixel comparison engine 624 can select the first pixel in the input video frame 602 that has not yet been processed (e.g., the pixel in the upper left hand corner). In another example, the pixel comparison engine 624 can select any pixel in the input video frame 602 that has not yet been processed. In some embodiments, the pixel comparison engine 624 can select a pixel location by the raster scan method, from left to right and from top to bottom.

The pixel comparison engine 624 can compare a pixel value (e.g., a pixel luminance value, a pixel chrominance value, a red value, a green value, a blue value, any combination thereof, or any other suitable value of a pixel) at the selected pixel location to the pixel values of pixels at corresponding pixel locations of one or more history planes within history planes database 604. The pixel comparison engine 624 can generate pixel comparison value(s) (i.e., difference value(s)) between the pixel value of the input video frame 602 and the corresponding pixel value(s) of the history planes within history planes database 604. In some embodiments, a pixel comparison value for each of the compared history planes can be passed from the pixel comparison engine 624 to the pixel classification engine 626. In some embodiments, the pixel comparison values for all of the compared history planes can be combined, and a metric (e.g., an average pixel comparison value, a median pixel comparison value, or other suitable value) can be passed from the pixel comparison engine 624 to the pixel classification engine 626.

In some embodiments, the pixel comparison engine 624 compares the pixel value of the input video frame 602 to pixel values of all of the history planes in history planes database 604, and generates pixel comparison values for each of these comparisons. In some embodiments, the pixel comparison engine 624 compares the pixel value of the input video frame 602 to the pixel values of only one or only some of the history planes in history planes database 604. The history planes to be compared to can be selected randomly or according to any criteria. For example, a set number of most recent history planes can be selected, a set number of random history planes can be selected, and the like.

The history planes database 604 can include any number of background history planes. Like the input video frame 602, a background history plane can include a set number of pixel locations. In some embodiments, the background history plane includes the same number of pixel locations as the input video frame 602. The background history plane can include a pixel value for a pixel location (e.g., a most recently observed value, an average of historical pixel values, a median of historical pixel values, or other suitable value) for the background and any persistent foreground at each pixel location of a scene captured by video frames. In some embodiments, each background history plane can correspond to the background and any persistent foreground of a previously received input video frame. For example, a $0^{th}$ background history plane can include the observed background pixel values and/or persistent foreground values of one or more input video frames received in a plurality of input video frames; the $1^{st}$ background history plane can include the background pixel values and/or persistent foreground values of one or more input video frames received in the plurality of input video frames; and so on. In some embodiments, the background history planes can include background pixel values and/or persistent foreground values of certain previous input video frames (e.g., the background pixel values and/or persistent foreground values of every 20th input video frame is processed to be used to update a background history plane). Although it may correspond to a previously received input video frame, pixel values of a background history plane can be updated with one or more of the pixel values of the current input video frame 602, as described further herein. Thus, although the Nth background history plane can initially reflect the background pixel values and any persistent foreground pixel values of one or more previous input video frames, those values can be changed during processing of later input video frames. Determination of background pixels and persistent foreground pixels is described further herein.

The generated pixel comparison values can be passed to the pixel classification engine 626. The pixel classification engine 626 can compare the pixel comparison values to a threshold. If a certain number of pixel comparison values are less than or equal to the threshold, the pixel at the selected pixel location can be classified as a background pixel. Otherwise, the pixel at the selected pixel location can be classified as a foreground pixel. The pixel classification engine 626 is described in further detail herein with respect to FIG. 7.

Once all of the pixels in the input video frame 602 have been classified by the pixel classification engine 626, the matrix of pixel values for background pixels can be passed to a mask generation engine 616. The mask generation engine 616 can be used by a background subtraction engine for foreground mask generation and to determine background and foreground pixels for an input video frame, as described herein with respect to FIG. 5. In some embodiments, the matrix or array of pixel values for the classified background pixels and persistent foreground pixels can be added to the history planes database 604. In some examples, the matrix or array of pixel values can be used to update one or more history planes.

The matrix can also be provided to a history plane update engine 628. The history plane update engine 628 can select one or more history planes to update from history planes database 604 according to any of a number of methods, as described further herein. The history plane update engine 628 can update the pixels in pixel locations of the selected history plane with the pixel values of classified background pixels at corresponding pixel locations of the input video frame 602. The history plane update engine 628 can also update certain pixels of the selected history plane with pixel values of classified foreground pixels that are persistent, as described further herein. The history plane update engine 628 is described in further detail herein with respect to FIG. 8.

Figure 7:
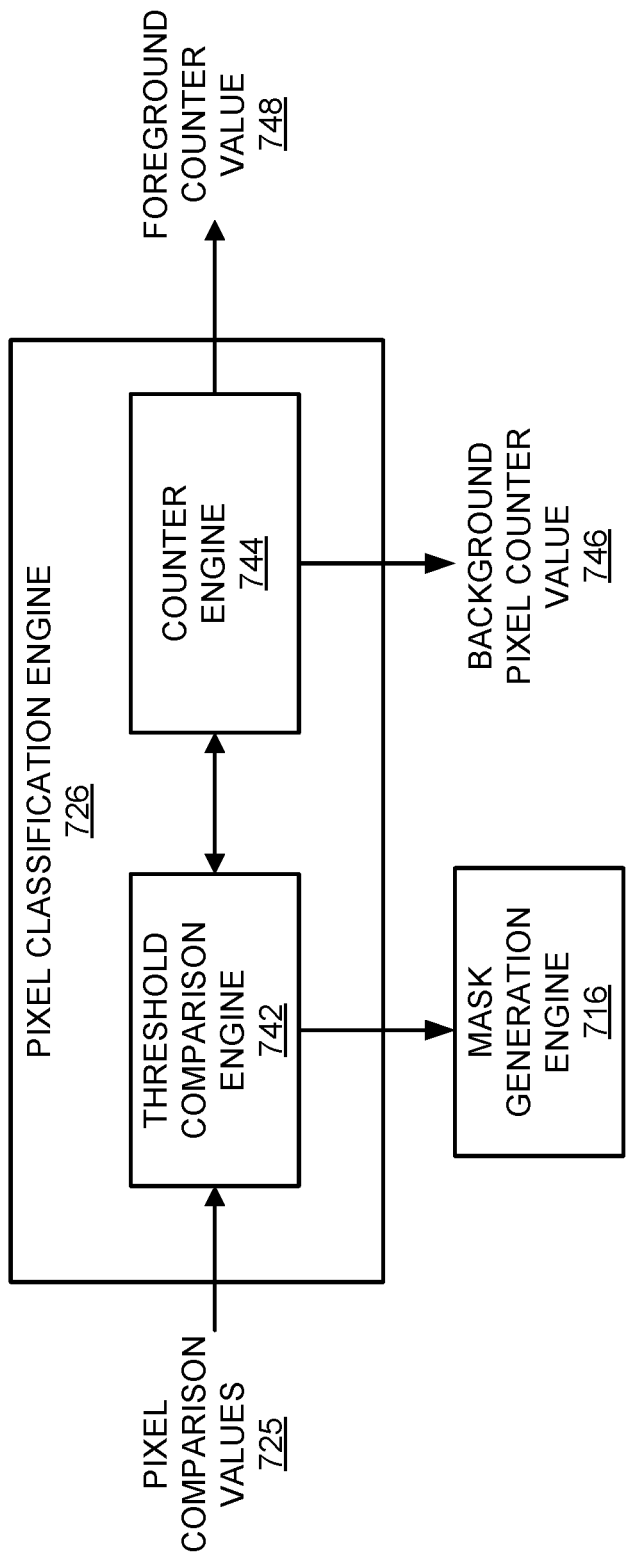
FIG. 7 is a block diagram illustrating an example of a pixel classification engine, in accordance with some examples.

FIG. 7 is a block diagram illustrating an example of a pixel classification engine 726 that includes multiple engines for classifying a pixel as a foreground pixel or a background pixel. In various implementations, the pixel classification engine 726 can receive pixel comparison values 725 as input, can include a threshold comparison engine 742 and a counter engine 744, and can provide as output a matrix of pixel values for classified background pixels and persistent foreground pixels to a mask generation engine 716, a background pixel counter value 746, and a foreground counter value 748.

As discussed above, the pixel classification engine 726 can receive pixel comparison values 725 from a pixel comparison engine. The pixel comparison values 725 can reflect the differences between the pixel value of an input video frame and the corresponding pixel values of the history planes within a history planes database. The pixel comparison values 725 can be provided to a threshold comparison engine 742.

The threshold comparison engine 742 compares the pixel comparison values 725 to a threshold comparison value to determine whether the pixel comparison values 725 exceed that threshold comparison value. The threshold comparison value can be any predetermined or dynamic value. For example, the threshold comparison value may be 5. Thus, a pixel comparison value of 7 (e.g., a difference between an input pixel value of 1 and a history plane pixel value of 8) would exceed the threshold comparison value. In another example, a pixel comparison value 725 of 3 (e.g., a difference between an input pixel value of 252 and a history plane pixel value of 249) would not exceed the threshold comparison value. In general, pixel values may fall within the range of 0 to 255.

The threshold comparison engine 742 can count the number of times the pixel comparison values 725 do not exceed the threshold comparison value (i.e., are equal to or below the threshold comparison value). If the pixel comparison values 725 are equal to or below the threshold comparison value a threshold number of times (e.g., a number of history planes), the pixel at that pixel location of the input video frame can be classified as a background pixel. If the pixel comparison values 725 exceed the threshold comparison value a threshold number of times, the pixel at that pixel location of the input video frame can be classified as a foreground pixel. The threshold number of history planes can be any predetermined or dynamic value (e.g., 2 history planes, 5 history planes, 10 history planes, 25% of the history planes, 50% of the history planes, 65% of the history planes, or any other suitable number or percentage of history planes).

Once all of the pixels for all of the pixel locations of an input video frame are processed, a matrix of pixel values for classified background pixels and persistent foreground pixels can be generated. The matrix can be used by a background subtraction engine for mask generation and to determine background and foreground pixels for an input video frame, as described herein with respect to FIG. 5.

When a given pixel is classified as either a background pixel or a foreground pixel, that classification can be provided to the counter engine 744. The counter engine 744 can maintain a background pixel counter value 746 for a frame and a foreground counter value 748 for each pixel. If a pixel of a given input video frame is classified as a background pixel, the background pixel counter value 746 can be incremented by 1 by counter engine 744. Thus, the background pixel counter value 746 can reflect the total number of background pixels in a given input video frame. In addition, if the pixel is classified as a background pixel, the counter engine 744 can reset the foreground counter value 748 at that particular pixel location to 0.

If a pixel at a certain pixel location of a given input video frame is classified as a foreground pixel, the foreground counter value 748 for that particular pixel location can be incremented by 1 by counter engine 744. Thus, the foreground counter value 748 can reflect the total number of consecutive times (i.e., across successive input video frames) a pixel at a given pixel location is classified as a foreground pixel. The matrix of pixel values for classified background pixels and persistent foreground pixels, background pixel counter value 746, and foreground counter value 748 can be provided to the history plane update engine, as described further herein.

Figure 8:
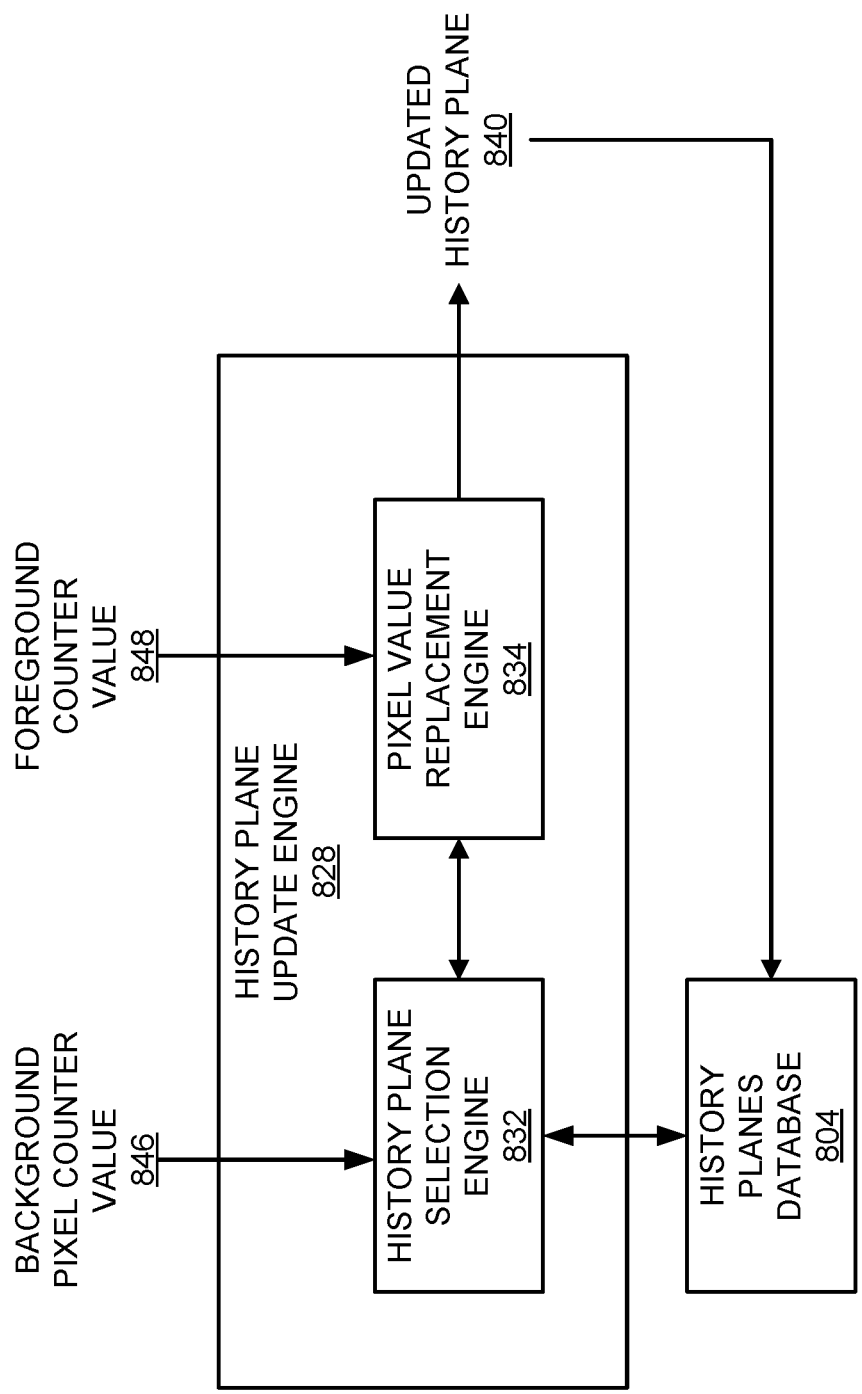
FIG. 8 is a block diagram illustrating an example of a history plane update engine, in accordance with some examples.

FIG. 8 is a block diagram illustrating an example of a history plane update engine 828 that includes multiple engines for updating a history plane based on the classification of a pixel as a foreground pixel or a background pixel. In various implementations, the history plane update engine 828 can receive a matrix of pixel values for classified background pixels and persistent foreground pixels, a background pixel counter value 846, and a foreground counter value 848 as input, can include a history plane selection engine 832 and a pixel value replacement engine 834, and can provide as output an updated history plane 840 that can be stored in history planes database 804.

As discussed above, the history plane update engine 828 can receive a matrix of pixel values for classified background pixels and persistent foreground pixels from the pixel classification engine. The matrix can be provided to a history plane selection engine 832, along with the background pixel counter value 846. The history plane selection engine 832 can access history planes database 804 to select a history plane to be updated. In some embodiments, the history plane to be updated can be selected randomly from the history planes database 804. In some embodiments, the history plane to be updated can be selected according to any criteria (e.g., consecutively). In some examples, more than one history plane can be selected for updating.

In some embodiments, the history plane to be updated can be selected using the background pixel counter value 846. In this example, the history planes can be assigned plane numbers (e.g., plane numbers 0 to 31 for 32 history planes). One or more bits of the background pixel counter value 846 can be used to derive a plane number. For example, the lower five bits of the background pixel counter value 846 (e.g., "11100") can correspond to a number of 28. Thus, in this example, the history plane corresponding to the plane number 28 can be selected and retrieved from the history planes database 804. One of ordinary skill will appreciate that any other suitable number of bits can be used to select a background history plane for updating. In some embodiments, the background pixel counter value 846 used reflects the total number of background pixels in the current input video frame. In some cases, the background counter can be updated for a current input frame once all the pixels of the current input frame are processed and classified. In such cases, during processing of a current input frame, the counter can hold background pixel information of a previous input frame. In some embodiments, the background pixel counter value 846 used reflects the total number of background pixels in a previous input video frame (e.g., the immediately preceding input video frame).

The history plane selection engine 832 can pass the matrix and the selected history plane to the pixel value replacement engine 834. The pixel value replacement engine 834 can replace pixel values for pixels in pixel locations of the selected history plane with the pixel values of classified background pixels in corresponding pixel locations of the input video frame. The pixel values and the classification of those pixels as background pixels can be derived from the matrix.

The pixel value replacement engine 834 can also receive a foreground counter value 848 from the pixel classification engine. The foreground counter value 848 can reflect the number of successive times a pixel at each pixel location has been classified as a foreground pixel. If the foreground counter value 848 for a particular pixel location exceeds a threshold persistence value, the pixel value replacement engine 834 can replace the pixel value for a pixel in the corresponding pixel location of the selected history plane with that of the input video frame. For example, pixel values at a pixel location that are classified as foreground for the duration of the threshold persistence value can thus be re-defined as background in the history plane that is being updated (e.g., an object that enters a scene and becomes static for a period of time, effectively becoming part of the background of a scene). The threshold persistence value can be any predetermined or dynamic value. For example, the threshold persistence value can be an integer greater than 30 (e.g., in a 30 frames per second (fps) video, 30 fps corresponds to 1 second).

Once the background pixels and the persistent foreground pixels of the input video frame are copied to the selected history plane, the pixel value replacement engine 834 can output the updated history plane 840. The updated history plane 840 can be stored back in the history planes database 804 for use in later iterations.

Figure 9:
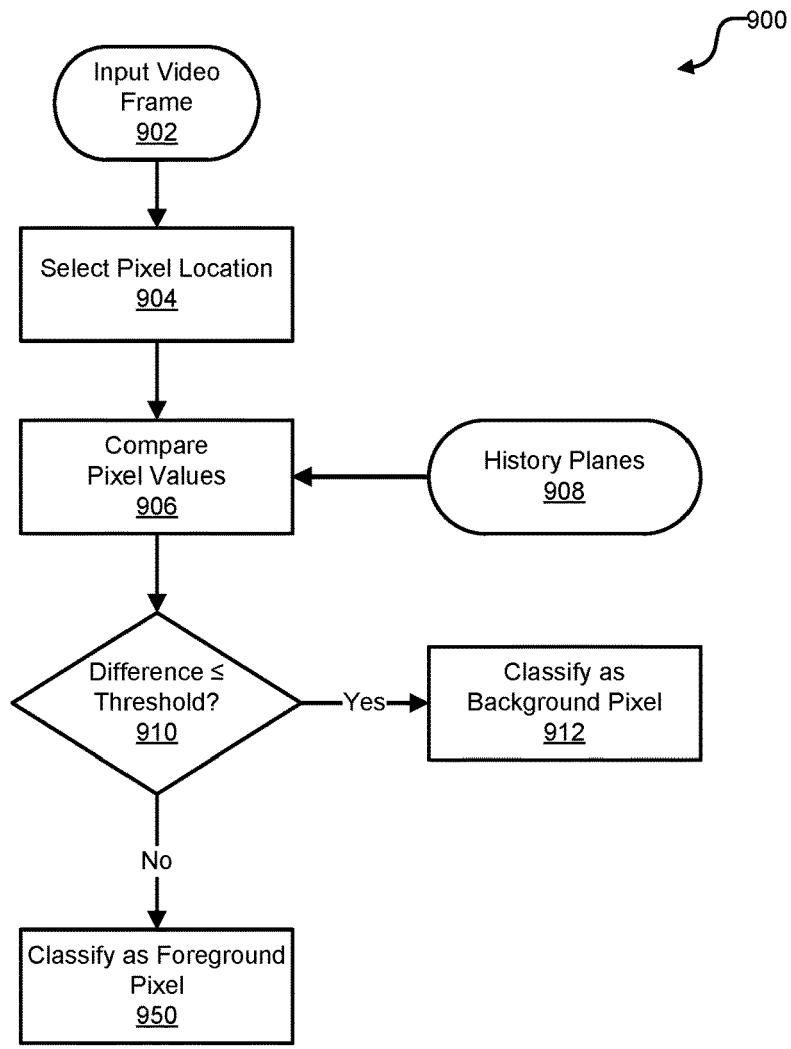
FIG. 9 is a flow chart illustrating an example of a process for classifying pixels of an input frame as foreground pixels or background pixels, in accordance with some examples.

FIG. 9 is a flow chart illustrating an example of a process 900 for classifying pixels of an input frame as foreground pixels or background pixels, in accordance with some examples. The process 900 illustrated can be implemented, for example, by the background modeling engine 614 of FIG. 6.

The example process 900 may be triggered by the receipt of an input video frame 902. The input video frame 902 may be received by, for example, a video analysis system that includes a background modeling engine. For each input video frame 902, the process 900 may select a pixel location at step 904. At step 906, the pixel value at that pixel location of the input video frame 902 may be compared to the pixel values at corresponding pixel locations of history planes 908. The history planes 908 may include pixel values for pixels of previous input video frames that were previously classified as background pixels.

The process 900 may determine, at step 910, whether the difference between the pixel value of the input video frame 902 and the pixel values of corresponding pixel locations of the history planes 908 are less than (or less than or equal to, in some examples) a threshold comparison value. If the differences between a pixel value of a pixel in a pixel location of the input video frame 902 and pixel values in corresponding pixel locations of a number of history planes are less than (or less than or equal to) a threshold comparison value for at least a threshold number of history planes, the pixel of the input video frame 902 may be classified as a background pixel at step 912. If the differences are not less than the threshold comparison value for the threshold number of history planes, the pixel of the input video frame 902 may be classified as a foreground pixel at step 950.

Figure 10:
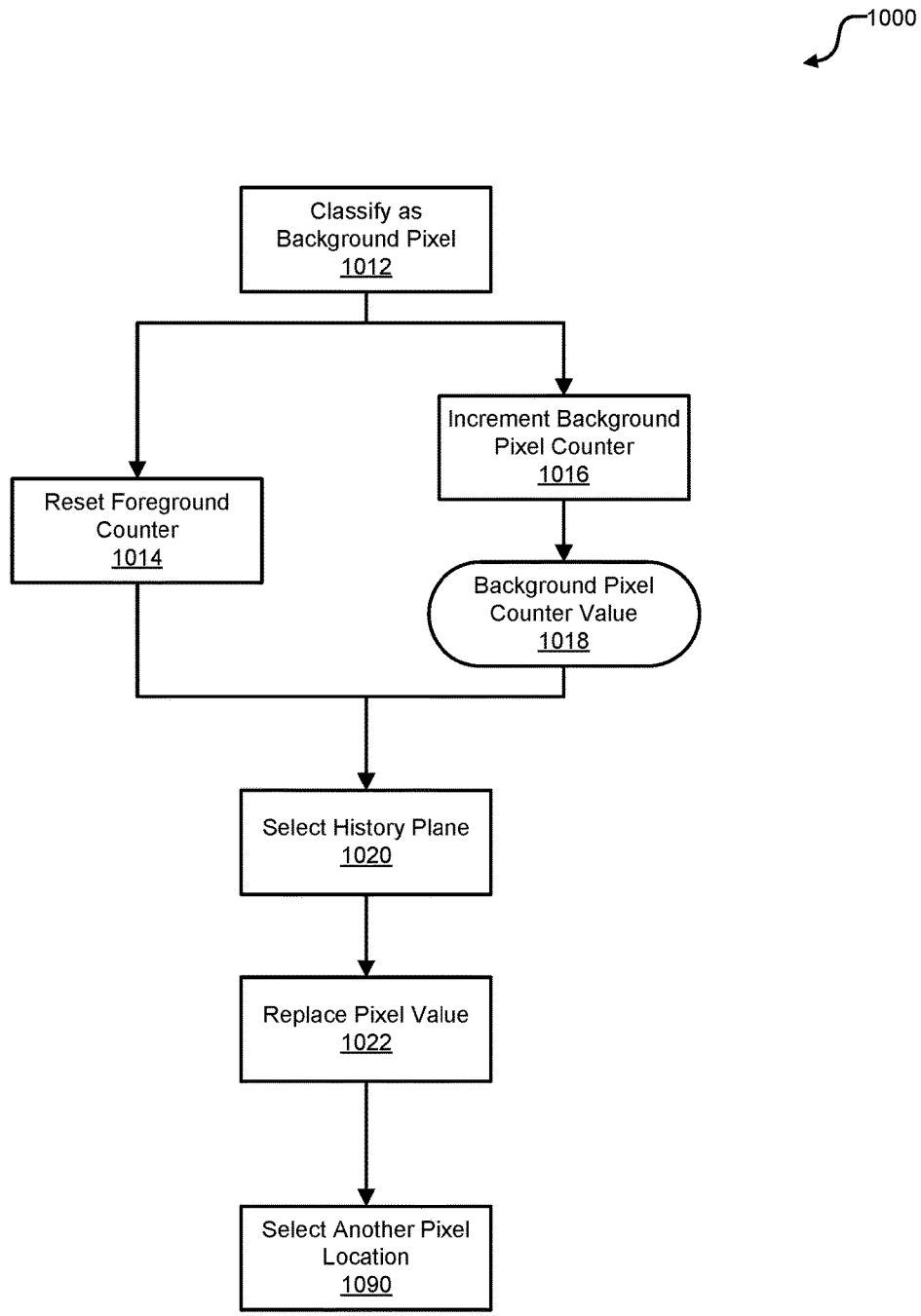
FIG. 10 is a flow chart illustrating an example of a process that is performed when a pixel of an input frame is classified as a background pixel, in accordance with some examples.

FIG. 10 is a flow chart illustrating an example of a process 1000 that is performed when a pixel of an input video frame is classified as a background pixel, in accordance with some examples. The process 1000 illustrated can be implemented, for example, by the background modeling engine 614 of FIG. 6.

The example process 1000 may be triggered by a pixel of an input video frame being classified as a background pixel at step 1012. After being classified as a background pixel at step 1012, the process 1000 may (1) reset a foreground counter at step 1014, and (2) increment a background pixel counter at step 1016, producing a background pixel counter value 1018. Although illustrated as being performed in parallel, it is contemplated that steps 1014 and 1016 may instead be performed consecutively or in series.

At step 1020, the process 1000 may select a history plane. The history plane may be selected randomly or according to any criteria. For example, the history plane may be selected according to one or more bits of the background pixel counter value 1018, as described further herein with respect to FIG. 8. Although shown and described as occurring after processing a pixel of an input video frame, it is contemplated that step 1020 may instead occur prior to processing any pixels of the input video frame in some embodiments. For example, in some examples, the selection of a history plane can occur before processing of a first pixel in the current input frame. In such an example, a background counter value of a previous frame can be used to select the history plane that will be updated using the background and/or persistent foreground pixel values of the current frame.

At step 1022, the pixel value at the pixel location of the history plane corresponding to the pixel location of the selected pixel of the input video frame is replaced with the pixel value of the selected pixel of the input video frame. At step 1090, another pixel location that has not yet been processed may be selected from the input video frame. The process can then repeat at step 906 of FIG. 9.

Figure 11:
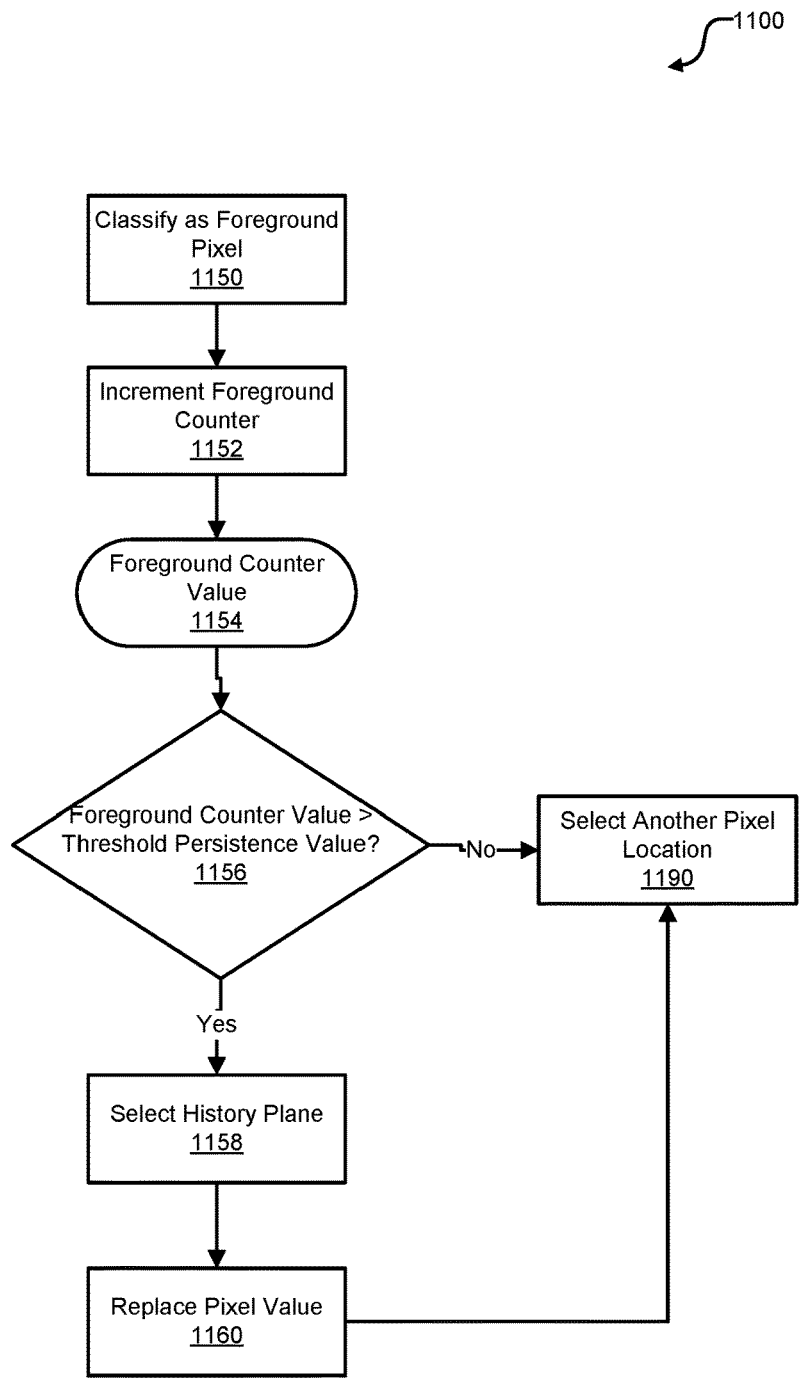
FIG. 11 is a flow chart illustrating an example of a process that is performed when a pixel of an input frame is classified as a foreground pixel, in accordance with some examples.

FIG. 11 is a flow chart illustrating an example of a process 1100 that is performed when a pixel of an input video frame is classified as a foreground pixel, in accordance with some examples. The process 1100 illustrated can be implemented, for example, by the background modeling engine 614 of FIG. 6.

The example process 1100 may be triggered by a pixel of an input video frame being classified as a foreground pixel at step 1150. After being classified as a foreground pixel at step 1150, the process 1100 may increment a foreground counter at step 1152, producing a foreground counter value 1154. The foreground counter value 1154 may reflect the number of times a pixel at a particular pixel location has been successively classified as a foreground pixel.

At step 1156, the process 1100 determines whether the foreground counter value 1154 exceeds a threshold persistence value. The threshold persistence value may represent the maximum number of times a pixel at a particular pixel location may be classified as foreground before it should be considered as part of the background. If the foreground counter value 1154 does not exceed the threshold persistence value, another pixel location that has not yet been processed may be selected from the input video frame. The process can then repeat at step 905 of FIG. 9.

If the foreground counter value 1154 exceeds the threshold persistence value, the process 1100 may select a history plane at step 1158. For example, the history plane may be selected according to one or more bits of the background pixel counter value 1018, as described further herein with respect to FIG. 8. If other pixels of the input video frame have previously been classified as background pixels or persistent foreground pixels, the same history plane may be selected that was previously updated with pixel values of the same input video frame. At step 1160, the pixel value at the pixel location of the history plane corresponding to the pixel location of the selected pixel of the input video frame is replaced with the pixel value of the selected pixel the input video frame. At step 1190, another pixel location that has not yet been processed may be selected from the input video frame. The process can then repeat at step 906 of FIG. 9.

FIG. 12A is a schematic diagram illustrating an example of input video frame 1200A, in accordance with some examples. As shown in FIG. 12A, input video frame 1200A may be made up of a matrix (or array) of pixel locations 1201A-1216A. Although shown as being a 4×4 matrix, it is contemplated that input video frame 1200A may have any number of rows and columns. Further, although illustrated as comprising 16 pixels 1201A-1216A, it is contemplated that input video frame 1200A may include any number of pixels. For example, the number of pixels and/or the number of rows and columns in each video frame can be determined by the resolution of the video data captured and generated by a video source (e.g., a video capture device, such as an IP camera, or the like).

FIG. 12B is a schematic diagram illustrating an example of a history plane 1200B, in accordance with some examples. As shown in FIG. 12B, history plane 1200B may be made up of a matrix of pixel locations 1201B-1216B. Although shown as being a 4×4 matrix, it is contemplated that history plane 1200B may have any number of rows and columns. Further, although illustrated as comprising 16 pixels 1201B-1216B, it is contemplated that history plane 1200B may include any number of pixels.

In some embodiments, history plane 1200B may have the same number of pixels, rows and columns as input video frame 1200A. Thus, history plane 1200B may have a corresponding pixel location for each pixel location of input video frame 1200A. As shown in FIGS. 12A-B, pixel 1201A of input video frame 1200A may correspond to pixel 1201B of history plane 1200B, pixel 1202A of input video frame 1200A may correspond to pixel 1202B of history plane 1200B, and so on.

Thus, according to some embodiments of the invention, the pixel value of pixel 1201A of input video frame 1200A may be compared to the pixel value of pixel 1201B of history plane 1200B. Further, if history plane 1200B is selected to be updated, the pixel value of pixel 1211A of input video frame 1200A, if classified as a background pixel, may be used to update the pixel value of pixel 1211B of history plane 1200B. Although described as comparing and updating values of particular pixel locations, it is contemplated that any corresponding pixel values of input video frame 1200A and history plane 1200B may be compared and updated.

Figure 13:
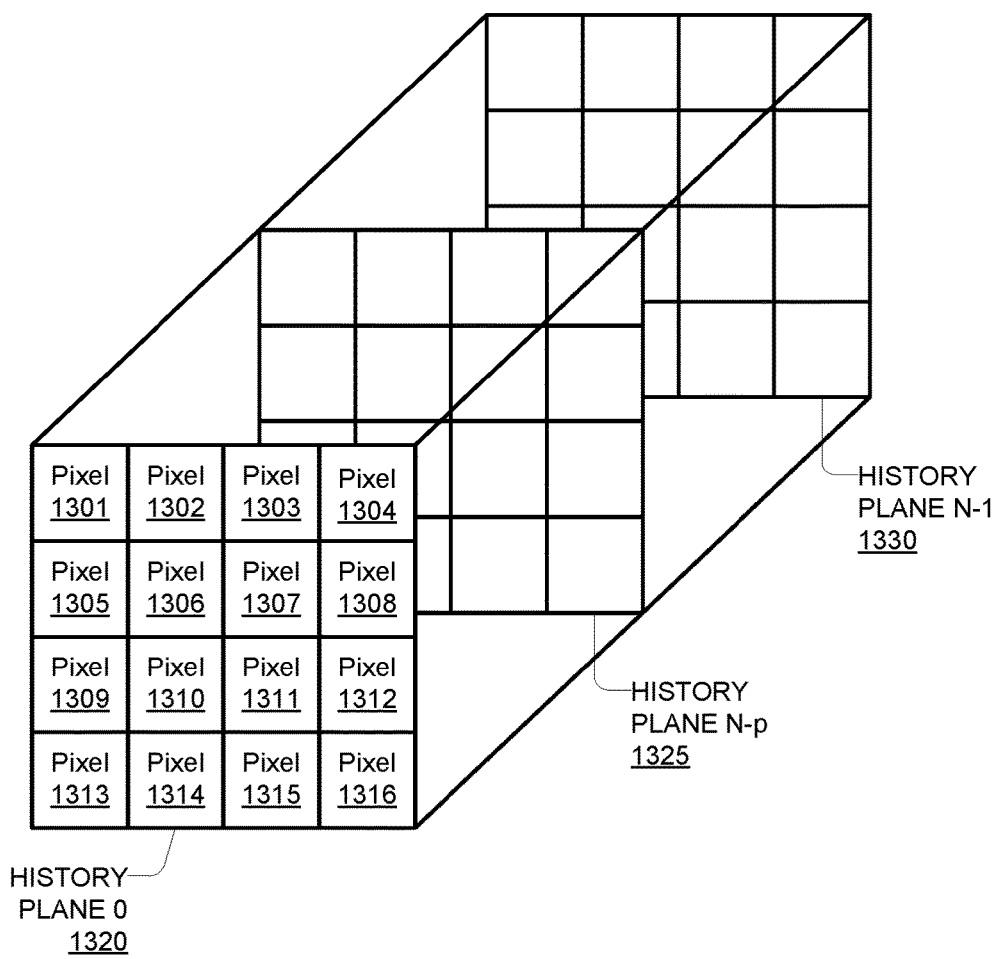
FIG. 13 is a schematic diagram illustrating a plurality of history planes, in accordance with some examples.

FIG. 13 is a schematic diagram illustrating a plurality of history planes, in accordance with some examples. The plurality of history planes include history plane 0 1320, history plane N-p 1325, and history plane N 1330. As illustrated, history plane 0 1320 may include a plurality of pixel locations 1301-1316. Although not labeled, it is contemplated that history plane N-p 1325 and history plane N 1330 similarly may be comprised of pixels having a similar number and similar dimensions.

Particular pixels can be identified by a set of coordinates in the x, y, and z planes, such as {x, y, z}. In some examples, the pixel location of {0, 0, 0} corresponds to the pixel in the upper left hand corner of the first history plane. For example, pixel location 1310 may be identified as {1, 2, 0}. In other words, pixel location 1310 may be the second pixel from the left, the third pixel from the top, and lie in history plane 0 1320. A corresponding pixel location in history plane N-p may be identified as {1, 2, N-p}. A corresponding pixel location in history plane N may be identified as {1, 2, N}.

Thus, according to some embodiments of the invention, the pixel value of a pixel of an input video frame corresponding to pixel location 1307 may be compared to the pixel value of pixel location 1307, the pixel value of the pixel location at {2, 1, N-p}, and the pixel value of the pixel location at {2, 1, N}. Further, if history plane N 1330 is selected to be updated, the pixel value of the pixel location of the input video frame, if classified as a background pixel or a persistent foreground pixel, may be used to update the pixel value of the pixel location at {2, 1, N}. Although described as comparing and updating particular pixel locations, it is contemplated that any corresponding pixel locations of the input video frame and the history planes 1320, 1325, 1330 may be compared and updated.

Figure 14:
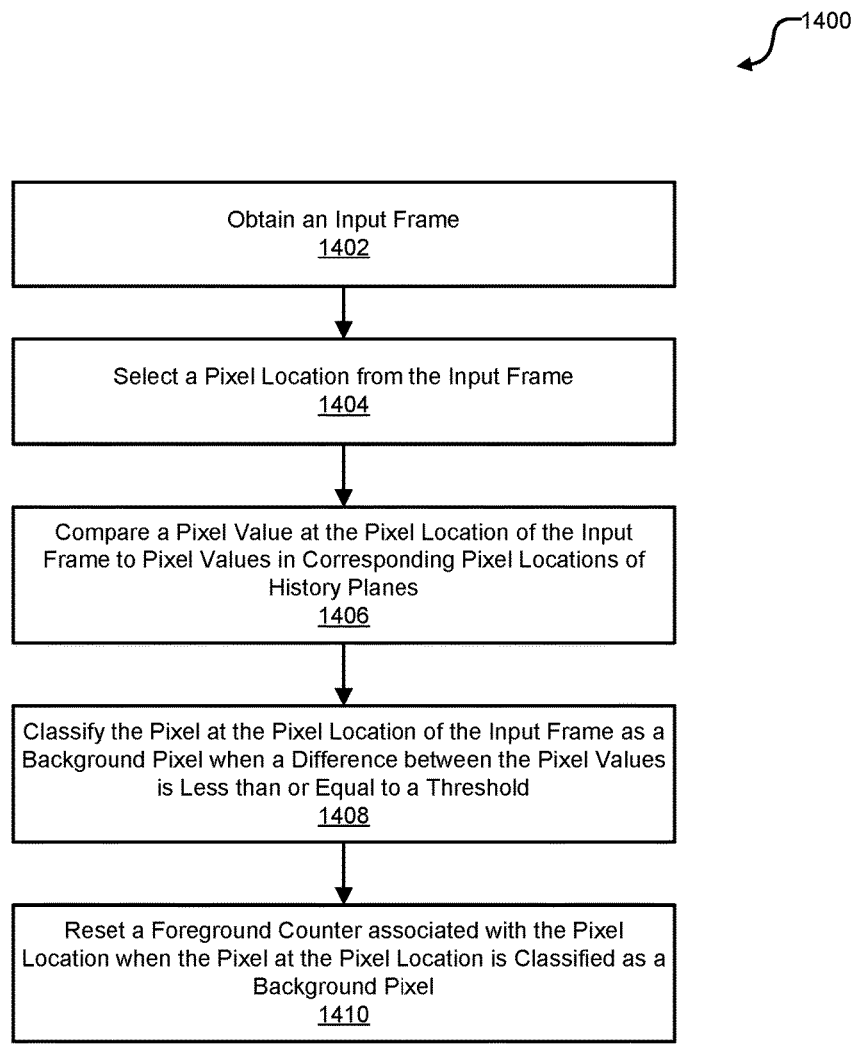
FIG. 14 is a flow chart illustrating an example of a process for background subtraction, in accordance with some examples.

Various methods may be used to implement the systems described herein. FIG. 14 is a flow chart illustrating an example of a process 1400 for background subtraction, in accordance with some examples. The process 1400 may be implemented, for example, by the background modeling engine 614 of FIG. 6.

At step 1402, the process 1400 includes obtaining an input frame. At step 1404, the process 1400 includes selecting a pixel location from the input frame. Any pixel location may be selected that has not already been processed. In some embodiments, the pixel location may be selected in raster scan order.

At step 1406, the process 1400 includes comparing a pixel value for a pixel at the selected pixel location to one or more pixel values in corresponding pixel locations of a plurality of history planes. Each of the plurality of history planes includes a historical background pixel value in a corresponding pixel location that corresponds to the selected pixel location. The pixel value may include a luminance value for the pixel.

At step 1408, the process 1400 includes classifying the pixel at the selected pixel location as a background pixel when a difference between the pixel value and the one or more pixel values in corresponding pixel locations of the plurality of history planes is less than or equal to a threshold value for a threshold number of history planes. For example, if the differences between a pixel value at the selected pixel location and pixel values in corresponding pixel locations of a number of history planes are less than (or less than or equal to, in some examples) the threshold value for at least a threshold number of history planes, the pixel at the selected pixel location may be classified as a background pixel.

At step 1410, the process 1400 includes resetting a foreground counter associated with the pixel location when the pixel at the selected pixel location is classified as a background pixel. The foreground counter includes a number of instances of one or more pixels at the selected pixel location being consecutively classified as a foreground pixel.

In some embodiments, the process 1400 may further include selecting a history plane from the plurality of history planes, and replacing a pixel value of a corresponding pixel location in the selected history plane with the pixel value at the selected pixel location of the input frame (not shown). In some embodiments, the history plane may be selected from the plurality of history planes randomly. In some embodiments, the process 1400 may further include incrementing a background pixel counter for the input frame when a pixel of the input frame is classified as a background pixel. In some embodiments, selecting the history plane from the plurality of history planes includes determining a value of the background pixel counter for a previous frame of a plurality of frames, deriving a plane number from one or more bits of the value of the background pixel counter, and selecting the history plane corresponding to the plane number.

In some embodiments, the process 1400 may further include selecting an additional pixel location from the input frame (e.g., in raster scan order, or in any other suitable order), obtaining a pixel value for a pixel at the selected additional pixel location, comparing the pixel value at the selected additional pixel location to one or more pixel values in corresponding additional pixel locations of the plurality of history planes, classifying the pixel at the additional pixel location as a foreground pixel when a difference between the pixel value at the selected additional pixel location and the one or more pixel values in the corresponding additional pixel locations is greater than the threshold value for a threshold number of history planes, and incrementing a foreground counter associated with the additional pixel location when the pixel at the selected additional pixel location is classified as a foreground pixel, the foreground counter including a number of instances of the additional pixel location being classified as a foreground pixel (not shown).

In some embodiments, the process 1400 may further include determining a value of the foreground counter associated with the additional pixel location is greater than a threshold persistence value, determining the selected history plane from the plurality of history planes, and replacing a pixel value at the additional pixel location of the selected history plane with the pixel value at the selected additional pixel location of the input frame when the value of the foreground counter is greater than the threshold persistence value (not shown).

In some examples, the process 1400 may be performed by a computing device or an apparatus, such as the video analytics system 100. For example, the process 1400 can be performed by the video analytics system 100 and/or the object tracking engine 106 shown in FIG. 1. In some cases, the computing device or apparatus may include a processor, microprocessor, microcomputer, or other component of a device that is configured to carry out the steps of process 1400. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1400 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The operations discussed herein may be implemented using compressed video or using uncompressed video frames (before or after compression). An example video encoding and decoding system includes a source device that provides encoded video data to be decoded at a later time by a destination device. In particular, the source device provides the video data to the destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by the source device. The destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. The destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of the source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. The source device and the destination device are merely examples of such coding devices in which the source device generates coded video data for transmission to the destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if the video source is a video camera, the source device and the destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of performing background subtraction for a plurality of video frames, the method comprising:
   obtaining an input video frame;
   selecting a pixel location from the input video frame, wherein a pixel at the pixel location has a pixel value;
   selecting a plurality of pixel values from a plurality of history planes, wherein the plurality of pixel values are selected from a plurality of pixel locations in the plurality of history planes, the plurality of pixel locations corresponding to the pixel location in the input video frame, and wherein the plurality of history planes represent a background of a scene captured by the plurality of video frames, each history plane including a pixel value for each pixel location in the scene;
   comparing the pixel value of the pixel at the pixel location in the input video frame to the plurality of pixel values at the plurality of pixel locations in the plurality of history planes;
   classifying the pixel at the pixel location in the input video frame as a background pixel when a difference between the pixel value of the pixel at the pixel location in the input video frame and at least a threshold number of pixel values from the plurality of pixel values at the plurality of pixel locations in the plurality of history planes is less than or equal to a threshold value; and
   resetting a foreground counter associated with the pixel location in the input video frame when the pixel value is classified as a background pixel, the foreground counter including a number of instances of pixels at the pixel location in the input video frame being consecutively classified as a foreground pixel.

2. The method of claim 1, further comprising:
   selecting a history plane from the plurality of history planes; and
   replacing a pixel value at a pixel location in the history plane with the pixel value of the pixel at the pixel location in the input video frame, wherein the pixel location in the history plane corresponds to the pixel location in the input video frame.

3. The method of claim 2, wherein the history plane is selected randomly from the plurality of history planes.

4. The method of claim 2, further comprising:
   incrementing a background pixel counter for the input video frame when a pixel of the input video frame is classified as a background pixel.

5. The method of claim 4, wherein selecting the history plane includes:
   determining a value of the background pixel counter;
   deriving a number from one or more bits of the value; and
   selecting the history plane based on an index of the history plane corresponding to the number.

6. The method of claim 2, wherein selecting the history plane includes:
   determining a value of a background pixel counter for a previous frame of the plurality of video frames;
   deriving a number from one or more bits of the value; and
   selecting the history plane based on an index of the history plane corresponding to the number.

7. The method of claim 1, further comprising:
   selecting an additional pixel location from the input video frame;
   obtaining a first pixel value for a pixel at the additional pixel location;
   selecting a second pixel value from a history plane from the plurality of history planes;
   comparing the first pixel value to the second pixel value;
   classifying the pixel at the additional pixel location as a foreground pixel when a difference between the first pixel value and at least the second pixel value is greater than the threshold value; and
   incrementing a foreground counter associated with the additional pixel location when the first pixel value is classified as a foreground pixel, the foreground counter including a number of instances of pixels at the additional pixel location being classified as a foreground pixel.

8. The method of claim 7, further comprising:
   determining that a value of the foreground counter associated with the additional pixel location is greater than a threshold persistence value; and
   replacing a pixel value at the additional pixel location in the history plane with the first pixel value when the value of the foreground counter is greater than the threshold persistence value.

9. The method of claim 1, wherein the pixel value of the pixel at the pixel location in the input video frame includes a luminance value for the pixel.

10. An apparatus for performing background subtraction for a plurality of video frames, the apparatus comprising:
    a memory configured to store video data; and
    a processor configured to:
    obtain an input video frame;
    select a pixel location from the input video frame, wherein a pixel at the pixel location has a pixel value;
    select a plurality of pixel values from a plurality of history planes, wherein the plurality of pixel values are selected from a plurality of pixel locations in the plurality of history planes, the plurality of pixel locations corresponding to the pixel location in the input video frame, and wherein the plurality of history planes represent a background of a scene captured by the plurality of video frames, each history plane including a pixel value for each pixel location in the scene;

compare the pixel value of the pixel at the pixel location in the input video frame to the plurality of pixel values at the plurality of pixel locations in the plurality of history planes;

classify the pixel at the pixel location in the input video frame as a background pixel when a difference between the pixel value of the pixel at the pixel location in the input video frame and at least a threshold number of pixel values from the plurality of pixel values at the plurality of pixel locations in the plurality of history planes is less than or equal to a threshold value; and reset a foreground counter associated with the pixel location in the input video frame when the pixel value is classified as a background pixel, the foreground counter including a number of instances of pixels at the pixel location in the input video frame being consecutively classified as a foreground pixel.

11. The apparatus of claim 10, wherein the processor is further configured to:

select a history plane from the plurality of history planes; and replace a pixel value at a pixel location in the history plane with the pixel value of the pixel at the pixel location in the input video frame, wherein the pixel location in the history plane corresponds to the pixel location in the input video frame.

12. The apparatus of claim 11, wherein the processor is configured to select the history plane randomly from the plurality of history planes.

13. The apparatus of claim 11, wherein the processor is further configured to:

increment a background pixel counter for the input video frame when a pixel of the input video frame is classified as a background pixel.

14. The apparatus of claim 13, wherein selecting the history plane includes:

determining a value of a background pixel counter for the input video frame;

deriving a number from one or more bits of the value; and selecting the history plane based on an index of the history plane corresponding to the number.

15. The apparatus of claim 11, wherein selecting the history plane includes:

determining a value of a background pixel counter for a previous frame of the plurality of video frames;

deriving a number from one or more bits of the value; and selecting the history plane based on an index of the history plane corresponding to the number.

16. The apparatus of claim 10, wherein the processor is further configured to:

select an additional pixel location from the input video frame;

obtain a first pixel value for a pixel at the additional pixel location;

select a second pixel value from a history plane from the plurality of history planes;

compare the first pixel value to the second pixel value;

classify the pixel at the additional pixel location as a foreground pixel when a difference between the first pixel value and at least the second pixel value is greater than the threshold value; and increment a foreground counter associated with the additional pixel location when the first pixel value is classified as a foreground pixel, the foreground counter including a number of instances of pixels at the additional pixel location being classified as a foreground pixel.

17. The apparatus of claim 16, wherein the processor is further configured to:

determining that a value of the foreground counter associated with the additional pixel location is greater than a threshold persistence value; and replacing a pixel value at the additional pixel location in the history plane with the first pixel value when the value of the foreground counter is greater than the threshold persistence value.

18. The apparatus of claim 10, wherein the pixel value of the pixel at the pixel location in the input video frame includes a luminance value for the pixel.

19. A non-transitory computer readable medium having stored thereon instructions that when executed by one or more processors, cause the one or more processors to:

obtain an input video frame;

select a pixel location from the input video frame, wherein a pixel at the pixel location has a pixel value;

select a plurality of pixel values from a plurality of history planes, wherein the plurality of pixel values are selected from a plurality of pixel locations in the plurality of history planes, the plurality of pixel locations corresponding to the pixel location in the input video frame, and wherein the plurality of history planes represent a background of a scene captured by a plurality of video frames, each history plane including a pixel value for each pixel location in the scene;

compare the pixel value of the pixel at the pixel location in the input video frame to the plurality of pixel values at the plurality of pixel locations in the plurality of history planes;

classify the pixel at the pixel location in the input video frame as a background pixel when a difference between the pixel value of the pixel at the pixel location in the input video frame and at least a threshold number of pixel values from the plurality of pixel values at the plurality of pixel locations in the plurality of history planes is less than or equal to a threshold value; and reset a foreground counter associated with the pixel location in the input video frame when the pixel value is classified as a background pixel, the foreground counter including a number of instances of pixels at the pixel location in the input video frame being consecutively classified as a foreground pixel.

20. The non-transitory computer readable medium of claim 19, further comprising instructions that when executed by the one or more processors, cause the one or more processors to:

select a second history plane from the plurality of history planes; and replace a pixel value at a pixel location in the history plane with the pixel value of the pixel at the pixel location in the input video frame, wherein the pixel location in the history plane corresponds to the pixel location in the input video frame.

21. The non-transitory computer readable medium of claim 20, wherein the history plane is selected randomly from the plurality of history planes.

22. The non-transitory computer readable medium of claim 20, further comprising instructions that when executed by the one or more processors, cause the one or more processors to:

increment a background pixel counter for the input video frame when a pixel of the input video frame is classified as a background pixel.

23. The non-transitory computer readable medium of claim 22, wherein selecting the second history plane includes:
determining a value of the background pixel counter;
deriving a number from one or more bits of the value; and
selecting the history plane based on an index of the history plane corresponding to the number.

24. The non-transitory computer readable medium of claim 20, wherein selecting the second history plane includes:
determining a value of a background pixel counter for a previous frame of the plurality of video frames;
deriving a number from one or more bits of the value; and
selecting the history plane based on an index of the history plane corresponding to the number.

25. The non-transitory computer readable medium of claim 19, further comprising instructions that when executed by the one or more processors, cause the one or more processors to:
select an additional pixel location from the input video frame;
obtain a first pixel value for a pixel at the additional pixel location;
select a second pixel value from a history plane from the plurality of history planes;
compare the first pixel value to the second pixel value;
classify the pixel at the additional pixel location as a foreground pixel when a difference between the first pixel value and at least the second pixel value is greater than the threshold value; and
increment a foreground counter associated with the additional pixel location when the first pixel value is classified as a foreground pixel, the foreground counter including a number of instances of pixels at the additional pixel location being classified as a foreground pixel.

26. The non-transitory computer readable medium of claim 25, further comprising instructions that when executed by the one or more processors, cause the one or more processors to:
determine that a value of the foreground counter associated with the additional pixel location is greater than a threshold persistence value; and
replace a pixel value at the additional pixel location in the history plane with the first pixel value when the value of the foreground counter is greater than the threshold persistence value.

27. The non-transitory computer readable medium of claim 19, wherein the pixel value of the pixel at the pixel location in the input video frame includes a luminance value for the pixel.

* * * * *